US 010189446B2

(12) United States Patent
Laurens et al.

(10) Patent No.: US 10,189,446 B2
(45) Date of Patent: Jan. 29, 2019

(54) END PIECE FOR A WIPER AND CORRESPONDING WIPING ASSEMBLY

(71) Applicant: Valeo Systèmes d'Essuyage, Le Mesnil Saint Denis (FR)

(72) Inventors: Romain Laurens, Issoire (FR); Stéphane Chevalier, Issoire (FR)

(73) Assignee: Valeo Systémes d'Essuyage, Le Mesnil Saint Denis (FR)

( * ) Notice: Subject to any disclaimer, the term of this patent is extended or adjusted under 35 U.S.C. 154(b) by 29 days.

(21) Appl. No.: 15/608,184

(22) Filed: May 30, 2017

(65) Prior Publication Data

US 2017/0341627 A1    Nov. 30, 2017

(30) Foreign Application Priority Data

May 31, 2016    (FR) ...................... 16 54874

(51) Int. Cl.
*B60S 1/38*    (2006.01)

(52) U.S. Cl.
CPC .......... *B60S 1/3889* (2013.01); *B60S 1/3806* (2013.01); *B60S 1/3881* (2013.01); *B60S 1/3891* (2013.01); *B60S 1/3894* (2013.01); *B60S 1/3886* (2013.01); *B60S 1/3887* (2013.01); *B60S 2001/3822* (2013.01)

(58) Field of Classification Search
CPC .... B60S 1/3886; B60S 1/3887; B60S 1/3889; B60S 1/3891; B60S 1/3894; B60S 1/3896; B60S 1/381; B60S 1/3881; B60S 2001/3822
USPC ...................... 15/250.451–250.454
See application file for complete search history.

(56) References Cited

U.S. PATENT DOCUMENTS

| 8,402,593 | B2 * | 3/2013 | Boland | ................... B60S 1/381 15/250.201 |
| 2008/0052865 | A1 * | 3/2008 | Chiang | ..................... B60S 1/38 15/250.43 |
| 2010/0319154 | A1 * | 12/2010 | Bousset | ................ B60S 1/3889 15/250.48 |

(Continued)

FOREIGN PATENT DOCUMENTS

| DE | 102007058091 | * | 6/2009 |
| FR | 2994916 | * | 3/2014 |
| WO | 2016/008998 | * | 1/2016 |

OTHER PUBLICATIONS

Machine translation of written description portion of WO2016008998, published Jan. 2016.*

(Continued)

*Primary Examiner* — Gary K. Graham
(74) *Attorney, Agent, or Firm* — Osha Liang LLP

(57) ABSTRACT

An end piece (100) for a wiper (102) provided with a rigidifying element (110) comprises a channel (120) for receipt of the rigidifying element, as well as first positioning stops (130), and a first means (150) for locking this element. The end piece comprises at least one second positioning stop (140) in order to cooperate equally well with a first or second type of rigidifying element with different dimensions.
The first positioning stops (130) are operational when the first type of rigidifying element (110) is inserted in the channel, and at least one second positioning stop (140) is operational when the second type of rigidifying element is inserted in the receipt channel (120).

14 Claims, 4 Drawing Sheets

(56) References Cited

U.S. PATENT DOCUMENTS

2016/0304061 A1* 10/2016 Gaucher .............. B60S 1/3891
2016/0304062 A1* 10/2016 Carrion ................ B60S 1/3889

OTHER PUBLICATIONS

Machine translation of written description portion of DE102007058091, published Jun. 2009.*

* cited by examiner

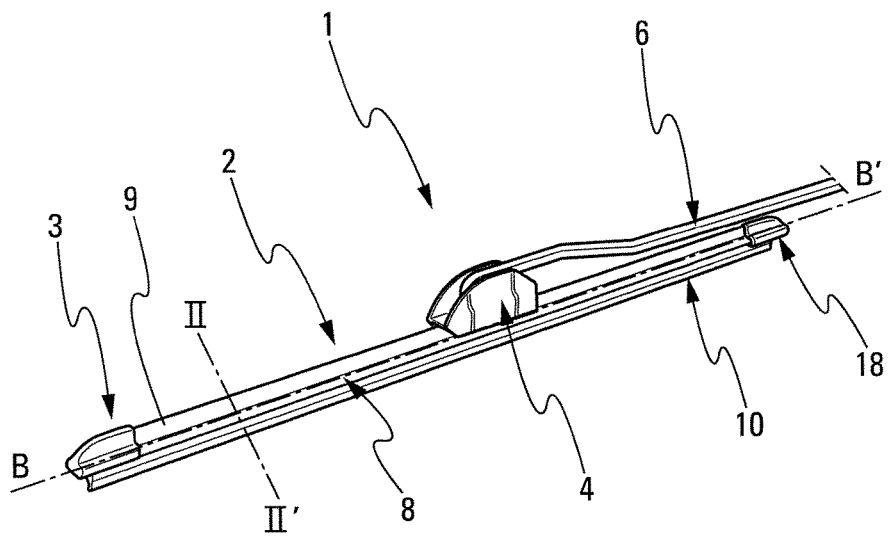
Fig. 1
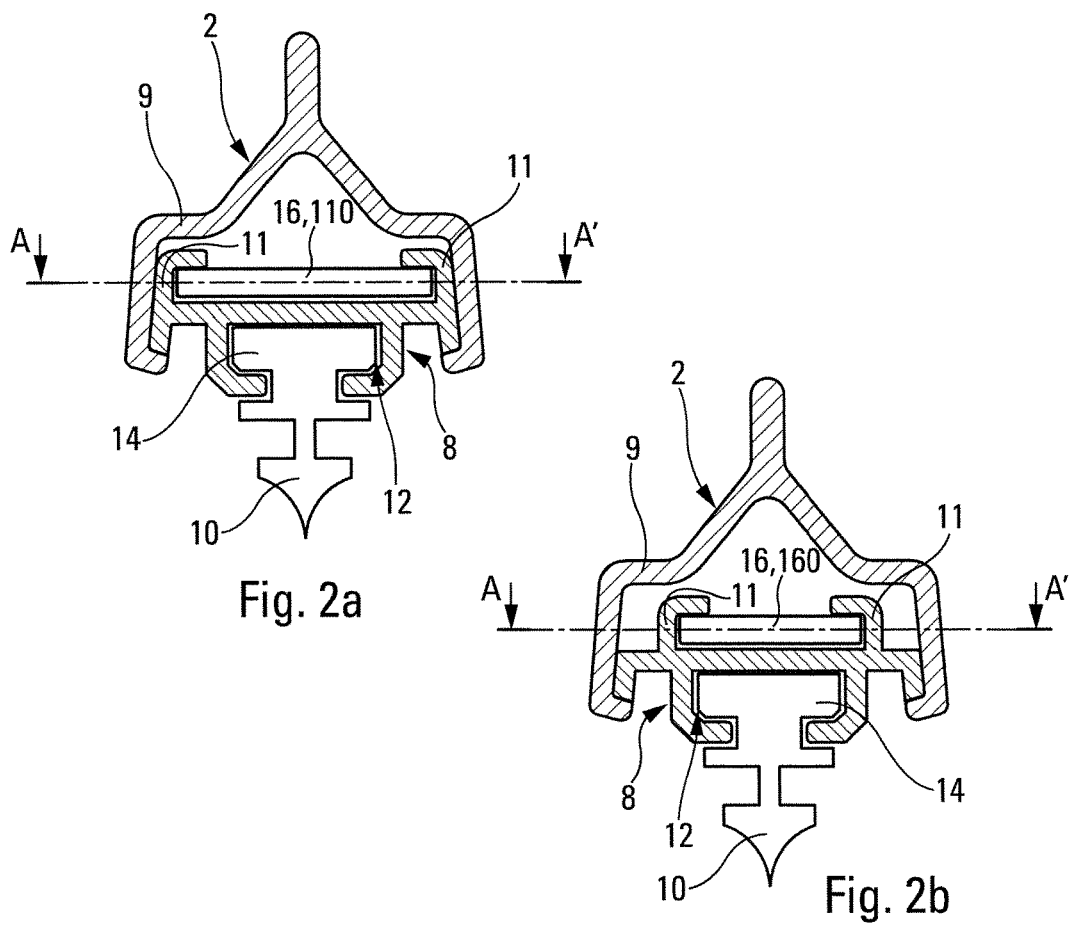
Fig. 2a
Fig. 2b

END PIECE FOR A WIPER AND CORRESPONDING WIPING ASSEMBLY

The present invention relates to the field of wiping of motor vehicle windows, and in particular the field of wiper assemblies. More specifically, the present invention relates to an end piece which is fitted on at least one end of a wiper blade.

Vehicle windows are generally equipped with a wiping assembly comprising at least one wiper arm which is rotated by motorised means, and a wiper disposed at the free end of the arm. The wipers generally comprise a support element for fitting of a rubber wiper blade which can be placed against the window to be cleaned, and at least one end piece to block the previously introduced blade in the support element by means of longitudinal sliding.

In addition, wipers are known which comprise one or a plurality of rigidifying elements, in particular in the form of a vertebra/vertebrae which extend(s) substantially along the entire length of the wiper, and the function of which is to ensure the contact of the wiper blade with the windscreen by means of a spring effect of the rigidifying element. These rigidifying elements are also configured to participate in the securing of the wiper in the end pieces by means of notches which are formed in the elements, and complementary forms of flexible means supported by the end pieces.

Each end piece comprises a receipt channel which is configured to receive and block an end of at least one rigidifying element which is associated with the wiper. The receipt channel is thus arranged according to the form and dimensions of the rigidifying element. However, the forms and dimensions of the ends of the rigidifying elements can vary according to the wiper model. Consequently, specific end pieces must be used for each wiper model.

In this context, the objective of the invention is to propose a standard end piece which makes it possible to adapt to different wipers which are provided respectively with a rigidifying element with specific dimensions, and which extends substantially according to a longitudinal axis of extension.

The end piece according to the invention comprises in particular a channel for receipt of the rigidifying element, which channel opens at a first longitudinal end of the end piece. The end piece also comprises first positioning stops, as well as a first means for locking the rigidifying element in the interior of the receipt channel. The first positioning stops are intended to guide the insertion of a first rigidifying element in the receipt channel, whereas the first locking means is designed to retain this first rigidifying element in the end piece.

The invention is characterised in that the end piece comprises at least one second positioning stop, such as to cooperate equally well with a first or second type of rigidifying element with dimensions different from one another. In this case "dimensions" means the dimensions of the end of the rigidifying element which is designed to be inserted in the channel for receipt of the end piece. The dimensions concerned in this case may be the dimensions of the rigidifying element defined on a plane perpendicular to its longitudinal axis of extension, i.e. its width and/or its height, or the dimension defined according to its longitudinal axis of extension, i.e. its length. Advantageously, the first positioning stops are arranged in the end piece such as to be operational when the first type of rigidifying element is inserted in the receipt channel, and the said at least one second positioning stop is operational when the second type of rigidifying element is inserted in the channel for receipt of the end piece. It will be appreciated that the different types of rigidifying element are introduced alternatively in the end piece. Thus, the invention allows a single end piece to adapt to rigidifying elements with different dimensions, and thus to different wiper models.

According to another characteristic of the invention, the first and at least one second positioning stops extend in the interior of the receipt channel, from at least one wall of the end piece. In other words, the positioning stops may be arranged inside the end piece, extending from a lateral wall such as to be perpendicular or substantially perpendicular to the longitudinal axis of extension of the rigidifying element when the latter is present in the channel for receipt of the end piece, and the stops may be arranged substantially parallel to the longitudinal axis of extension when they extend from a base wall of the end piece. The first and the at least one second positioning stops may thus project from at least one lateral wall of the end piece, on the understanding that the lateral wall(s) delimit(s) at least part of the receipt channel.

According to another characteristic of the invention, a free end of at least one second positioning stop is disposed closer to the longitudinal median plane than a free end of the first positioning stops. The term "longitudinal median plane" means a plane which passes via the middle of the channel for receipt of the end piece. Thus, the first and at least one second positioning stops may respectively guide the insertion of a rigidifying element of a first and second type of rigidifying element, with the first type of rigidifying element having larger dimensions than the second type of rigidifying element.

It is possible for at least one second positioning stop to be arranged in the channel such as to be recessed from the first positioning stops relative to the first longitudinal end of the end piece and the direction of insertion of the rigidifying element in the end piece. In other words, the first positioning stops can be reached by the first longitudinal end of a end piece during its insertion in the end piece, before the second positioning stop(s).

In this case in particular, at least one second positioning stop can have a first stop face for the first type of rigidifying element and a second stop face for the second type of rigidifying element. As their name indicates, the stop faces are designed to be in contact with a type of rigidifying element during its introduction into the channel for receipt of the end piece. It is understood that a second positioning stop of this type, the purpose of which is to ensure the positioning of the second type of rigidifying element, can also participate, by means of the action of its first stop face, in the positioning of the first type of rigidifying element.

According to a series of characteristics, taken alone or in combination, it is possible:

for at least one second positioning stop to comprise means which are retractable at the passage of a first type of rigidifying element. The term "retractable" designates means which can curve or break, such as to permit the passage of the first type of rigidifying element, with larger dimensions than those of the second type of rigidifying element, in the channel for receipt of the end piece. Thus, a second positioning stop can be placed upstream from a first positioning stop, without preventing the introduction into the receipt channel of a first type of rigidifying element. The term "upstream" is defined relative to the direction of introduction of a rigidifying element in the receipt channel. Advantageously, this characteristic of the invention permits greater freedom in the arrangement of the positioning stops in the receipt channel;

for the retractable means to comprise at least one retractable stud arranged in the extension of a fixed stud, with this fixed stud forming part of a first positioning stop;

for the retractable stud to have a thickness smaller than the thickness of the fixed stud. The term "thickness" means in this case the dimension(s) of a stud on a plane which is perpendicular or substantially perpendicular to its axis of extension in the channel for receipt of the end piece;

for the retractable means to be studs which are distinct from fixed studs which form the first stops.

A second locking means can be provided in the end piece, and, in this context, the first and second locking means can extend respectively from two opposite lateral walls which delimit the channel for receipt of the end piece.

According to another characteristic of the invention, at least one third positioning stop is arranged, for example in the form of a stud, projecting from a base wall. In this case, the term "base wall" means a wall delimiting the receipt channel, which wall is opposite the longitudinal first end of the end piece, and adjacent to the lateral walls. Preferably, the stud which is disposed projecting from the base wall has its free end configured to cooperate with the end of a rigidifying element introduced into the end piece. For example, this stud can have a form and dimensions which are complementary or compatible with a receptacle or a notch present at the end of a rigidifying element.

The end piece may comprise a transverse wall onto which the channel for receipt of the rigidifying elements opens. In particular, together with an end portion of the lateral wall of the end piece, the said transverse wall forms a receptacle for the body of the wiper. In particular, this body comprises the support element and the deflector, which is or is not integral. In other words, the first end of the end piece may comprise a cavity which can receive part of the wiper, such as to ensure better retention of the end piece on the said wiper. It will be appreciated that the receipt channel opens into the base of the said cavity.

In addition, the present invention also relates to a wiping assembly comprising a wiper which is driven by a motorised assembly, the said wiper comprising a wiper blade and a rigidifying element, comprising at least at one of its longitudinal ends an end piece as previously defined.

It is possible for the end piece to be configured to be fitted on a longitudinal end of a rigidifying element of the wiper, the same end piece being used equally well with a first or a second type of rigidifying element.

Also, the end piece can comprise a stud disposed projecting from a base wall, the form and dimensions of which stud can cooperate with a notch present at an end of the rigidifying element.

It will be appreciated that the characteristics, variants and different embodiments of the invention previously described can be associated with one another according to different combinations.

The above-described characteristics of the invention, as well as others, will become more apparent from reading the following detailed description of non-limiting examples with reference to the following appended drawings:

FIG. 1 is a schematic view in perspective of a wiping assembly according to the invention;

FIGS. 2a and 2b are views of a wiping assembly which is configured to comprise a first type of rigidifying element (FIG. 2a) or a second type of rigidifying element (FIG. 2b) in transverse cross-section according to the cross-sectional plane II-II represented in FIG. 1;

Figure 3:
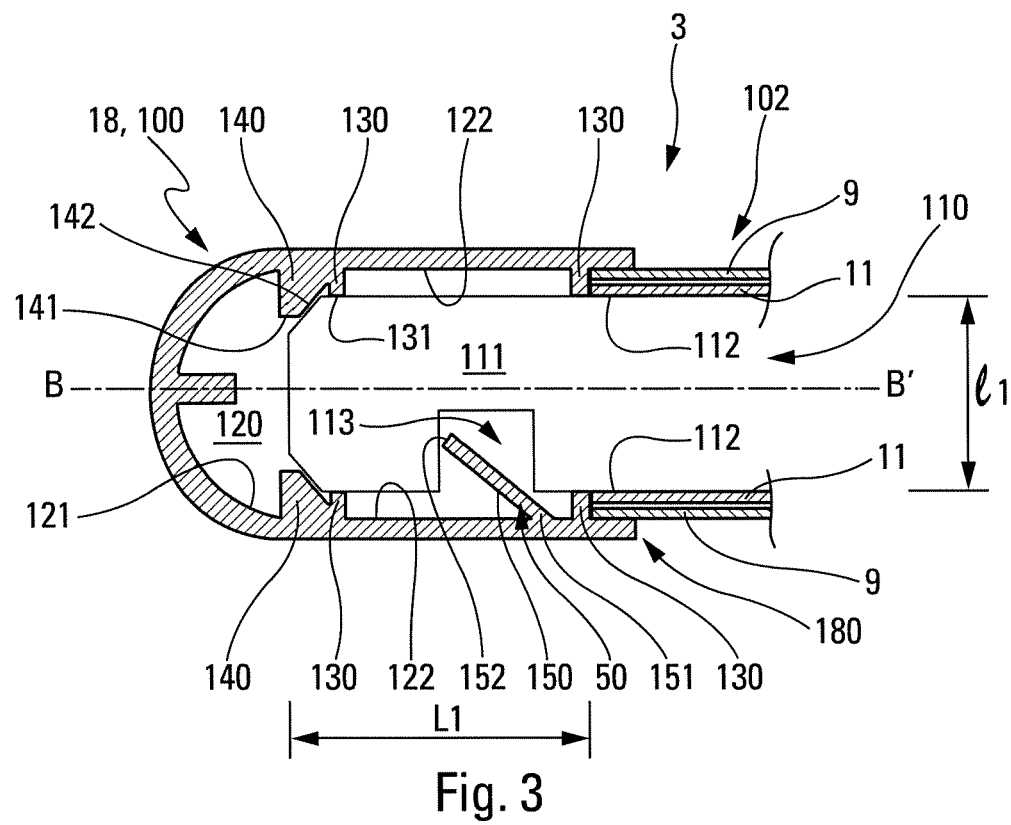
FIGS. 3 and 4 are partial longitudinal cross-sections seen from above according to the cross-sectional plane A-A' represented in FIGS. 2a and 2b of an end piece according to a first embodiment of the invention, secured on a first type of element for rigidifying a wiper, respectively on a second type of element for rigidifying a wiper.

A wiping assembly 1 is illustrated in FIG. 1. It comprises mainly a wiper 2 retained by means of a connector 4 on the end of an actuating arm 6. The actuating arm is driven by a motor (not represented) such as, during its displacement, to allow the wiper to clean at least part of the windscreen of a vehicle. For this purpose, the wiper 2 comprises a support element 8 (shown in FIG. 2) which is configured to support a wiper blade 10 and retain it against the surface of the windscreen. More specifically, as illustrated in FIG. 2, in a lower part which is turned towards the windscreen in the position of use, the support element 8 has a groove 12 in which the heel 14 of the wiper blade is slid, and it also comprises a receptacle for a rigidifying element or vertebra 16 which extends along the wiper, in particular along an axis of extension B-B' (shown in FIG. 3).

A deflector 9 is disposed such as to cover the support element 8. In the example illustrated, this deflector is a part which is distinct from the support element, and is secured on the latter. It will be understood that, without departing from the context of the invention, the deflector can be produced integrally with the support element.

The receptacle for the rigidifying element is delimited laterally, i.e. transversely to the axis of extension B-B', by walls 11 which form a guide rail for the rigidifying element. At least two types of rigidifying elements can be inserted in the element for support of the wiper, distinguishable by their dimensions. In order to provide correct lateral retention of each of these rigidifying elements, a first support element is provided (FIG. 2a) which is configured to comprise a first type of rigidifying element, with walls 11 which are spaced from one another according to a first dimension (first width), and a second support element is provided (FIG. 2b) which is configured to comprise a second type of rigidifying element, with walls 11 which are spaced from one another by a second dimension (second width), which is smaller than the first dimension.

It can be seen in FIGS. 2a and 2b that the spacing of the walls 11 is modified according to the type of rigidifying element provided in the wiper, and that the resulting spacing relative to the spoiler is also variable, whereas the lower part of the support element, which is configured to accommodate the wiper blade, is unchanged.

Once the wiper blade 10 has been put into place by insertion of the heel in the groove, the longitudinal ends of the groove 12 are blocked by means of end pieces 18 shown in FIG. 1. The end pieces make it possible to prevent the wiper blade from being displaced along the groove, and thus becoming detached from the wiper. Each end piece 18 comprises a receipt channel 120 which is configured to receive and block an end of the rigidifying element. The end piece is secured in position by cooperation of the end piece with the corresponding end of the rigidifying element 16 which extends from the support element 8. The channel for receipt of the rigidifying element opens at a first longitudinal end 180 of the end piece 18.

A description will be provided hereinafter of a plurality of embodiments of this receipt channel and of the positioning stops which are disposed in them, in order to form together with a given rigidifying element a device 3 for retention of the wiper blade in the wiper, and in particular in the support element, on the understanding that, according to the invention, a plurality of positioning stops makes it possible to cooperate equally well with a first or a second type of rigidifying element.

Figure 4:
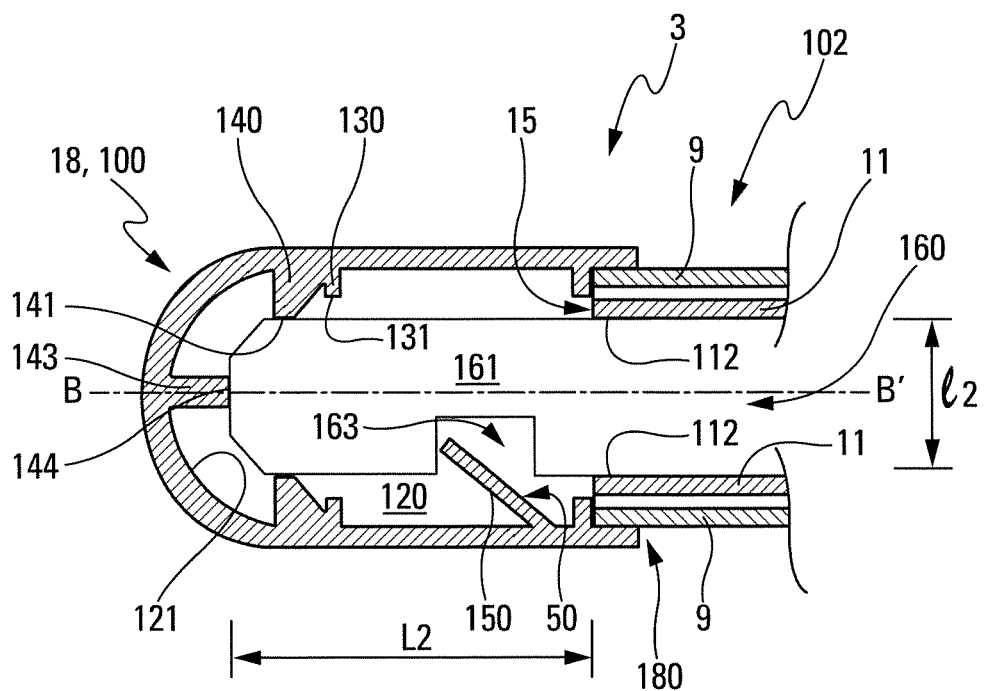

FIGS. 3 and 4 illustrate a first embodiment of an end piece 100 secured on a wiper 102 comprising a wiper blade which is arranged below a rigidifying element.

FIG. 3 illustrates the end piece cooperating with a rigidifying element of a first type 110, which extends longitudinally from the wiper 102. The first type of rigidifying element is characterised by a first width $l_1$ and by a first length $L_1$ (the reference being shown in particular in FIG. 6). In the present invention, width means the distance, perpendicular to the axis of extension B-B', which separates the lateral walls 112 of the rigidifying elements, arranged opposite walls which define the rail for guiding on the support element. Also, length of the rigidifying element means the distance along the axis of extension according to which the rigidifying element projects from the end of the support element.

The end 111 of the rigidifying element is inserted in a receipt channel 120 provided in the end piece 100. The receipt channel is delimited by a base wall 121 adjacent to the lateral walls 122 of the channel. Each lateral wall 122 comprises at least two first positioning stops 130 which extend transversely in the interior of the receipt channel, such as to project from their corresponding lateral wall 122. In the example illustrated, the first positioning stops are in the form of studs. More specifically, the first positioning stops are arranged in the receipt channel, such that their free end which forms a top 131 can be supported against the lateral walls 112 of the rigidifying element of a first type 110 during its insertion in the receipt channel. Thus, advantageously, the first positioning stops 130 guide and position the rigidifying element of a first type 110 during its insertion in the end piece 100. In other words, the first positioning stops 130 ensure the lateral retention of the end 111 of the rigidifying element of a first type in the receipt channel 120.

The end piece 100 also comprises second positioning stops 140 which are positioned between the first stops 130 and the base wall 121. In the example illustrated, the second positioning stops consist of studs. As for the first positioning stops previously described, it will be understood that without departing from the context of the invention, the second stops could have forms other than those described, such as ribs. The second stops 140 also extend transversely in the interior of the receipt channel, such as to project from the lateral walls 122. Each second stop 140 comprises a free end forming a top 141 which extends beyond the tops 131 of the first stops 130, such that the tops 141 of the second stops are closer to the median plane BB' of the receipt channel than the tops 131 of the first stops. Thus, the lateral faces 142 of the second stops, which are turned opposite the base wall 121, block the longitudinal progression of the end 111 of the rigidifying element of a first type 110 in the receipt channel 120. Preferably, the lateral faces 142 have a form complementary to that of the end 111 of the rigidifying element of a first type, and in this case a bevelled surface, such as to make possible a larger contact surface between these elements.

In order to prevent the withdrawal of the rigidifying element from the receipt channel 120 when the end 111 abuts the second positioning stops 140, the receipt channel also comprises a first locking means constituted by a flexible blade 150. A first end 151 of the flexible blade is retained on a lateral wall 122 of the receipt channel, between two first stops 130 which extend projecting from this lateral wall, such that the opposite free end 152 is oriented towards the base wall 121, and extends towards the longitudinal axis of the receipt channel, beyond the tops 131 of the first positioning stops. The flexible blade 150 is sufficiently flexible to curve during the passage of the end 111, in order not to impede its insertion. It is also sufficiently resilient to allow its free end 152 to return to its initial position, and thus be accommodated in a cavity 113 in the rigidifying element 110. The figure illustrates the cavity 113 which opens into a lateral wall 112 of the rigidifying element 110. The blade 150 thus prevents the withdrawal of the rigidifying element of a first type 110 from the channel by acting as a stop supported in the cavity 113.

FIG. 4 illustrates the same end piece as FIG. 3, cooperating with a rigidifying element of a second type 160, and more specifically at its end 161. The rigidifying element of a second type 160 differs from the rigidifying element 110 of the first type firstly in that it has a second width $l_2$ which is smaller than the first width $l_1$ previously described, and secondly in that it has a second length $L_2$ which is longer than the first length $L_1$ previously described, i.e. it projects further from the end of the support element than the rigidifying element of a first type does.

Consequently, the tops 131 of the first stops 130 can no longer guide the insertion of the end 161 of the rigidifying element of a second type 160 in the receipt channel 120. This guiding is thus carried out by the tops 141 of the second stops 140, as represented in FIG. 4.

It will be understood that the presence of the second stops participates in the guiding and retention in position of each type of rigidifying element, in cooperation with the first stops, when a first type of rigidifying element is inserted, and in cooperation with a third positioning stop 143 when a second type of rigidifying element is inserted.

This third stop is arranged projecting from the base wall 121, and the free end 144 which forms a top of this third stop 143 is oriented and arranged in the receipt channel such as to stop the progression of the end 161 of the rigidifying element 160 in the receipt channel 120. In the example illustrated, this third stop 143 is in the form of a stud. In the same way as for the first type of rigidifying element 130, the rigidifying element of the second type 160 comprises a cavity 163 which can cooperate with the flexible blade 150 in order to prevent its withdrawal from the receipt channel 120.

It is understood that the dimensions, forms and/or arrangements of the first stops 130, the second stops 140, the third stop 143 and the blade 150 can be modified in comparison with the description given, in order to adapt to specific forms and dimensions of rigidifying elements, provided that these positioning stops and the locking blade make it possible to guide and lock rigidifying elements of a first and a second type.

A description will now be provided of other embodiments with reference to FIGS. 5 to 8, in which the references where the tens are identical to the aforementioned references designate elements which are identical or similar.

Figure 5:
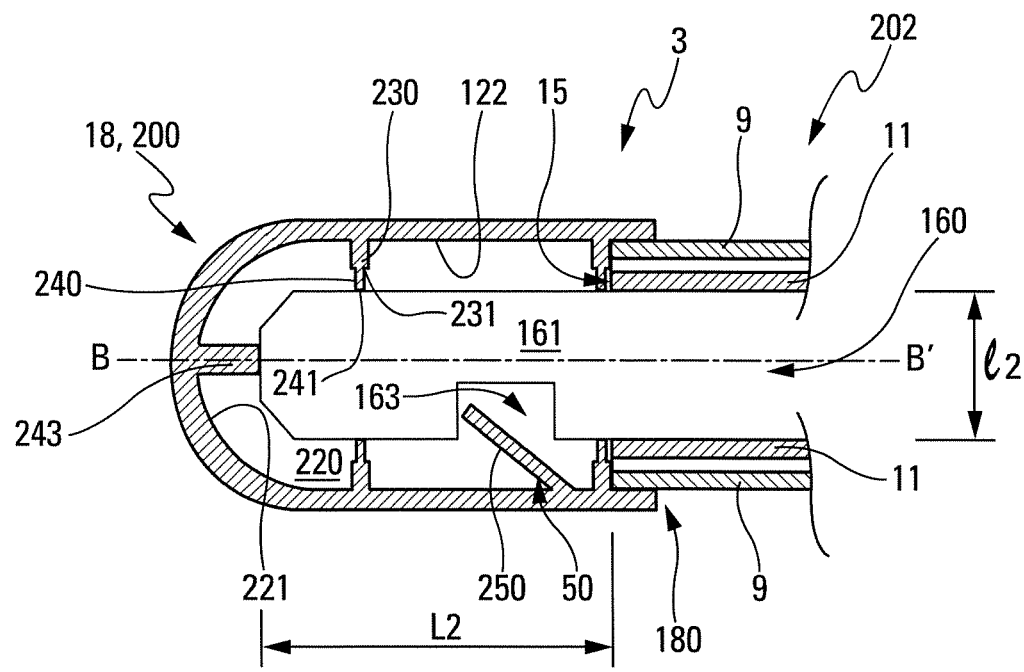
FIGS. 5 and 6 are partial longitudinal cross-sections seen from above according to the cross-sectional plane A-A' represented in FIGS. 2a and 2b of an end piece according to a second embodiment of the invention, secured on a second type of element for rigidifying a wiper, respectively on a first type of element for rigidifying a wiper.
Figure 6:
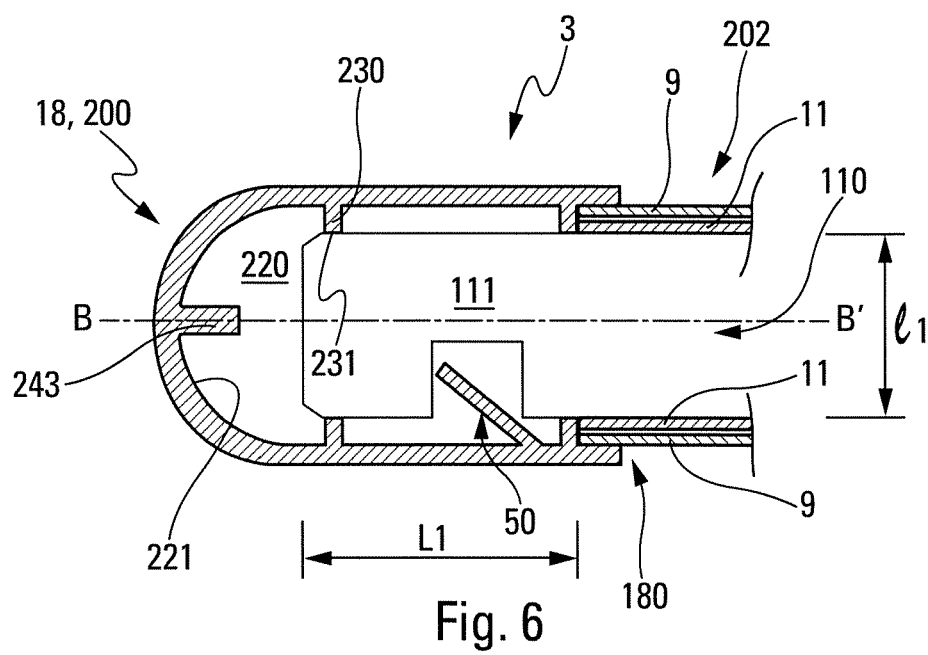

FIGS. 5 and 6 illustrate a second embodiment of an end piece 200 secured on a wiper 202. This second embodiment differs from the first in that the second stops 240, which are arranged at the lateral walls 222 of the receipt channel 220, are now arranged at the top 231 of the first stops 230. As previously, the tops 241 of the second stops make it possible to guide the progression and transverse retention of the rigidifying element of a second type 160 in the receipt channel 220. In the example illustrated, the end of the rigidifying element of a second type 160 is then stopped by a third stop 243 which is present on the base wall 221.

The second positioning stops 240 have a thickness smaller than the thickness of the first stops 230, in order to permit the passage of the rigidifying element of a first type, as illustrated in FIG. 6. During the insertion of this rigidifying element of a first type 110, its end 111 comes into contact with the two stops 240 disposed closer to the longitudinal axis of the receipt channel than the first stops 230. In addition, the smaller thickness of the second positioning stops makes them retractable, i.e. in this case they can be broken or bent at the passage of the end of the rigidifying element of a first type 110. This end breaks or bends the second stops 240 which are present at the top of the first stops 230. Thus, the tops 231 of the first stops 230 are laid bare, such as to be able to guide the insertion of the end 111 of the rigidifying element of a first type 110 in the receipt channel 220 as previously described. According to a variant not represented, the end of the rigidifying element of a first type 110 is then stopped by the third stop 243 present on the base wall 221.

Figure 7:
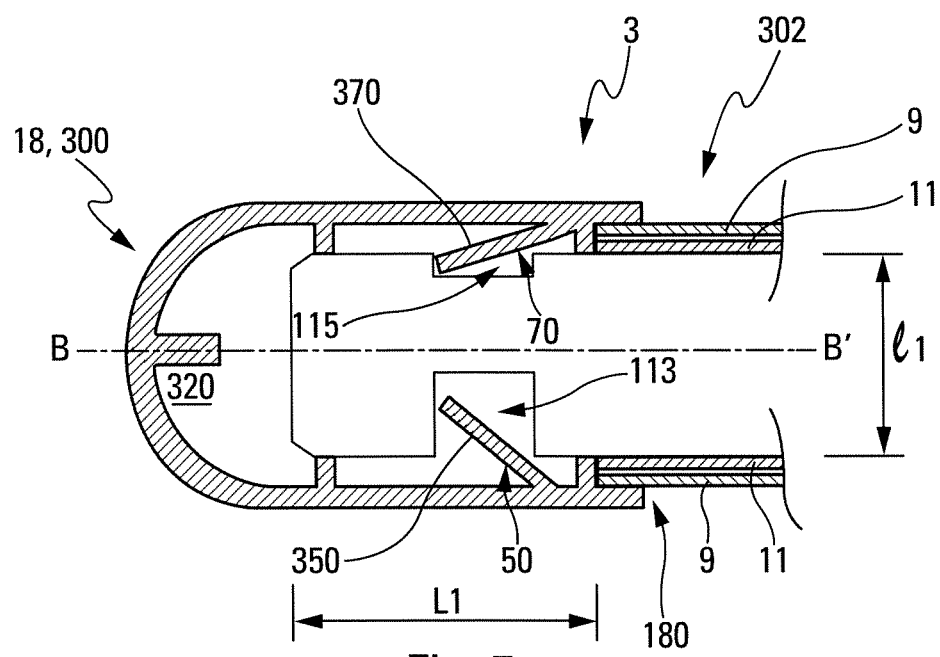
FIG. 7 is a partial longitudinal cross-section seen from above according to the cross-sectional plane A-A', represented in FIGS. 2a and 2b, of a third embodiment of the invention.

FIG. 7 illustrates a third embodiment in which the end piece 300 fitted at an end of a wiper 302 is a variant of the second embodiment represented in FIG. 6. According to this variant, the end piece 300 comprises a second locking means constituted by a second flexible blade 370, which is arranged in the same manner as the blade 350, but on an opposite lateral face. This second flexible blade 370 is configured to cooperate with a third cavity 115 of the rigidifying element. The figure illustrates the cavity 115 opening onto a lateral wall of the end of the rigidifying element, such as to ensure better retention of the said end in the channel 320. It should be noted that the third cavity can have a form and/or dimensions which are different in comparison with the first cavity. It will be appreciated that this variant can also be implemented in combination with the first embodiment previously described.

Figure 8:
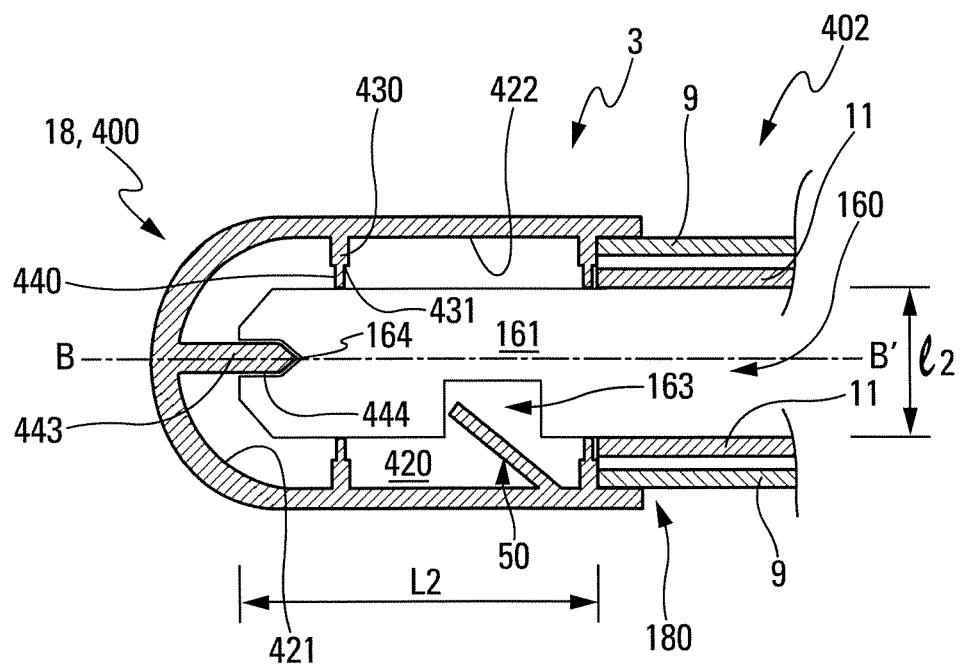
FIG. 8 is a partial longitudinal cross-section seen from above according to the cross-sectional plane A-A' represented in FIGS. 2a and 2b, of a fourth embodiment of the invention.

FIG. 8 illustrates a fourth embodiment in which the end piece 400, fitted at an end of a wiper 402, is a variant of the second embodiment represented in FIG. 5. According to this variant, the third stop 443 arranged on the base wall 421 which delimits the receipt channel 420 has at its top 444 a form which is complementary with a second cavity 164 present at the end 161 of the rigidifying element 160 of a second type. These elements have a complementary form in order to ensure better retention of the rigidifying element in the receipt channel, both longitudinally and transversely. It will be appreciated that this variant can also be adapted to each of the embodiments previously described, and to the use with one or the other of the types of rigidifying elements. It will be noted that the stud or rib which forms this third stop projecting from the base wall extends substantially according to the direction of insertion of the rigidifying element in the end piece, and that this rigidifying element is inserted until the stud or the rib penetrates inside the rigidifying element, in a notch with a corresponding form. For this purpose, it is advantageous in particular for the stud or rib to have a free end forming a top 444 with a form which makes possible a ramp in order to facilitate the insertion of the rigidifying element.

In the examples illustrated, the end piece 18 comprises a transverse wall which forms together with an end portion of the lateral wall of the end piece a receptacle 15 of the wiper body. In particular, this body comprises the support element and the deflector, which is or is not integral.

The first and second stops of the end pieces illustrated are positioned symmetrically relative to a plane perpendicular to the rigidifying element, and passing via the longitudinal axis of extension B-B'.

The invention claimed is:

1. An end piece for a wiper provided with a rigidifying element which extends substantially according to a longitudinal axis of extension, the end piece comprising:
   a channel for receipt of the rigidifying element, which opens at a first longitudinal end of the end piece;
   first positioning stops;
   a first means for locking the rigidifying element in the interior of the receipt channel; and
   at least one second positioning stop to cooperate equally well with a first or second type of rigidifying element with dimensions different from one another,
   the first positioning stops being operational when the first type of rigidifying element is inserted in the receipt channel, and
   the at least one second positioning stop being operational when the second type of rigidifying element is inserted in the channel for receipt of the end piece,
   wherein the first positioning stops and the at least one second positioning stop are separate from the first means for locking the rigidifying element, and project from at least one lateral wall of the end piece, and
   wherein a free end of the at least one second positioning stop is disposed further than a free end of the first positioning stops from the at least one lateral wall.

2. The end piece according to claim 1, wherein the first positioning stops and the at least one second positioning stop extend transversely in the interior of the receipt channel.

3. The end piece according to claim 1, wherein the at least one second positioning stop is arranged in the channel to be recessed from the first positioning stops relative to the first longitudinal end of the end piece.

4. The end piece according to claim 3, wherein at least one second positioning stop has a first stop face for the first type of rigidifying element and a second stop face for the second type of rigidifying element.

5. The end piece according to claim 1, wherein the at least one second positioning stop consists of means which are retractable at the passage of the first type of rigidifying element.

6. The end piece according to claim 5, wherein the retractable means comprise at least one retractable stud arranged in the extension of a fixed stud which forms part of a first positioning stop.

7. The end piece according to claim 6, wherein the at least one retractable stud has a thickness smaller than the thickness of a fixed stud.

8. The end piece according to claim 5, wherein the retractable means are retractable studs which are distinct from fixed studs which form the first positioning stops.

9. The end piece according to claim 1, further comprising a second locking means.

10. The end piece according to claim 9 wherein the first and second locking means extend respectively from two opposite lateral walls which delimit the channel for receipt of the end piece.

11. The end piece according to claim 1, wherein a third positioning stop comprises a stud which is disposed projecting from a base wall.

12. The end piece according to claim 1, further comprising a transverse wall onto which the said channel for receipt of the rigidifying elements opens, the said transverse wall forming together with an end portion of the lateral face of the end piece a receptacle for the body of the wiper.

13. A wiping assembly comprising a wiper comprising: at least one wiper blade; and a rigidifying element comprising at least at one of its longitudinal ends an end piece according to claim 1, configured to be fitted on a longitudinal end of the rigidifying element of the wiper, the same end piece being used equally with a first or a second type of rigidifying element.

14. The wiping assembly according to claim 13, wherein the end piece comprises a stud disposed projecting from a base wall, the form and dimensions of which stud can cooperate with a notch present at an end of a rigidifying element.

* * * * *